United States Patent [19]
Medin

[11] Patent Number: 6,130,723
[45] Date of Patent: Oct. 10, 2000

[54] METHOD AND SYSTEM FOR IMPROVING IMAGE QUALITY ON AN INTERLACED VIDEO DISPLAY

[75] Inventor: David Medin, Los Altos, Calif.

[73] Assignee: Innovision Corporation, Cupertino, Calif.

[21] Appl. No.: 09/007,395

[22] Filed: Jan. 15, 1998

[51] Int. Cl.[7] .................................................. H04N 7/01
[52] U.S. Cl. ........................ 348/607; 348/609; 348/910; 348/447; 348/448; 345/147; 345/58; 382/254; 382/272; 358/160; 358/167
[58] Field of Search ................................. 348/607, 609, 348/625, 624, 630, 631, 910, 447, 448, 446; 345/103, 58, 100, 147, 1.2; 382/254, 272; 358/160, 167; H04N 7/01, 5/14

[56] References Cited

U.S. PATENT DOCUMENTS

| | | |
|---|---|---|
| 4,454,506 | 6/1984 | Netravali et al. . |
| 4,799,105 | 1/1989 | Mitchell ................................. 348/607 |
| 4,888,529 | 12/1989 | Madsen et al. . |
| 4,924,315 | 5/1990 | Yamashita . |
| 4,947,251 | 8/1990 | Hentschel ............................. 348/452 |
| 5,132,795 | 7/1992 | Campbell . |
| 5,136,385 | 8/1992 | Campbell ............................. 358/160 |
| 5,146,329 | 9/1992 | Flamm . |
| 5,182,643 | 1/1993 | Futscher ............................... 348/447 |
| 5,428,456 | 6/1995 | Parulski et al. . |
| 5,510,843 | 4/1996 | Keene .................................. 348/441 |
| 5,689,301 | 11/1997 | Christopher .......................... 348/98 |
| 5,963,262 | 10/1999 | Ke ........................................ 348/910 |

*Primary Examiner*—Mark R. Powell
*Assistant Examiner*—Wesner Sajous
*Attorney, Agent, or Firm*—Sawyer Law Group LLP

[57] ABSTRACT

The present invention provides a method and system for reducing flicker within an interlaced image. The method and system comprises identifying an area of the interlaced image where flicker needs to be reduced and adaptively adjusting a pattern of pixels derived from a non-interlaced spatial relationship of the interlaced image within the area based upon characteristics of the image. A flicker filter is provided which utilizes an adaptive technique whereby pixel-blending characteristics are constantly changed within the image depending on particular image attributes. It is unique in that high vertical resolution is maintained for detailed image content such as text and most graphics, while flicker is effectively reduced on image content that is flicker prone. The filter is based on psycho-visual studies and simulations performed by the company as well as numerous prior flicker filter implementations. This has achieved the goal to maximize vertical resolution, enhancing text and graphics sharpness while still suppressing noticeable flicker. In the present invention, the flicker filter attributes are fully programmable allowing optimization for particular system configurations (screen size, display type, graphics resolutions, etc). The present invention is particularly useful for textual content which is generally not flicker prone yet requires high vertical resolution for comfortable reading.

112 Claims, 11 Drawing Sheets

Original Unfiltered Image

Image After Vertical Filter

FIG. 6

|  | Original Text Fonts | Filtered Text Fonts |
|---|---|---|
| 20 Lines per Frame |  |  |
| 40 Lines per Frame |  |  |

Display Field | Double Pixel Horizontal Line
(No Flicker Filter)

FIG. 11A

Filtered

| Input Pixel | Weighting Coefficient |
|---|---|
| Above | 0.25 |
| Current | 0.5 |
| Below | 0.25 |

Table 1.

FIG. 13

|  | Image Feature | Background Field |
|---|---|---|
| 1. | Black | White |
| 2. | White | Black |
| 3. | White | Grey |
| 4. | Grey | White |
| 5. | Black | Grey |
| 6. | Grey | Black |

Table 2.

FIG. 14

| Image Feature Width (In Pixels) | Coefficient Weighting in 3-Line Anti-Flicker Filter | | | | | |
|---|---|---|---|---|---|---|
| | Light Pixel Groups | | | Dark Pixel Groups | | |
| | Top | Center | Bottom | Top | Center | Bottom |
| 1 | 0 | 90 | 0 | 0 | 100 | 0 |
| 2 | 10 | 80 | 0 | 10 | 90 | 0 |
| 3 | 25 | 70 | 0 | 20 | 80 | 0 |
| 4-5 | 40 | 60 | 0 | 30 | 70 | 0 |
| 6-8 | 50 | 50 | 0 | 40 | 60 | 0 |
| 9-12 | 40 | 50 | 10 | 50 | 50 | 0 |
| 12 to 16 | 30 | 50 | 20 | 33 | 50 | 17 |
| 17 and Above | 25 | 50 | 25 | 25 | 50 | 25 |

Table 3.

FIG. 15

METHOD AND SYSTEM FOR IMPROVING IMAGE QUALITY ON AN INTERLACED VIDEO DISPLAY

FIELD OF THE INVENTION

The present invention relates generally to display systems and more particularly to a system and method for improving the image quality on an interlaced video display screen.

BACKGROUND OF THE INVENTION

In order to minimize signal bandwidth requirements, broadcast television uses the interlaced scan line technique. In one scan field the odd lines are displayed (lines 1, 3, 5, etc.) and in the next scan field even lines are displayed (lines 2, 4, 6, etc.). In the US NTSC broadcast standard, scan fields are displayed at a rate of 60 fields per second, with odd and even scan field alternating. As such, odd scan fields are displayed 30 times per second and even fields also 30 times per second. In the PAL broadcast standard, there are 50 fields per second, or 25 odd and even fields per second.

Human visual persistence is such that the 50 or 60 fields per second causes little noticeable image flicker, assuming the adjacent odd/even field lines are similar. In normal broadcast picture content, image processing is imposed such that only subtle pixels value changes occur between adjacent odd and even lines. This means that the differences in the odd and even fields are minor, so essentially the same image is being refreshed at 50 or 60 times per second, minimizing flicker.

Progressive Scan Computer Images

Computer displays use the non-interlaced or progressive scan line technique. The entire image (including each sequential scan line) is displayed 60–90 times per second, depending on the system. In computer applications, interlace scan would cause severe image flicker since there are drastic pixel value changes between adjacent scan lines within the text and graphics images of typical applications. For example, using interlaced scan, a horizontal white line that is one pixel high on a black background would noticeably flicker at 30 times per second (using a 60 frame/sec interlaced display). By using progressive scan, fine vertical detail can be used on the computer display without producing noticeable flicker.

Computer Display on the Broadcast Television

There are products on the market that adapt the progressive scan computer video output to an interlaced scan video format suitable for a broadcast television receiver. The simplest of devices do this conversion with no temporal image processing. This typically results in severe image flicker problems because of the sharp changes in vertical pixel values as explained above. More elaborate devices apply a vertical image filter, commonly known as a "flicker filter", prior to interlacing the image. The flicker filter essentially blends the value of vertically adjacent pixels to decrease the differences in adjacent odd/even lines. This dramatically reduces the noticeable image flicker, but equally as noticeably reduces the level of vertical detail as compared to the original computer display. Thus, the general consensus has formed in the computer industry that high resolution graphics is not compatible with the interlaced display format used in broadcast television.

The Standard 3-Line "Flicker Filter"

Figure 1:
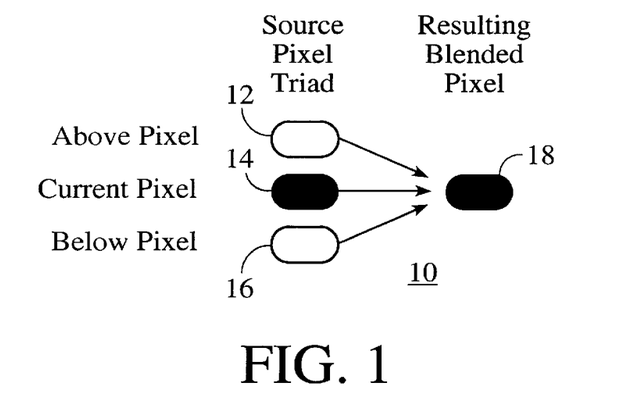
FIG. 1 conceptually illustrates a vertical spatial filter.
Figure 2:
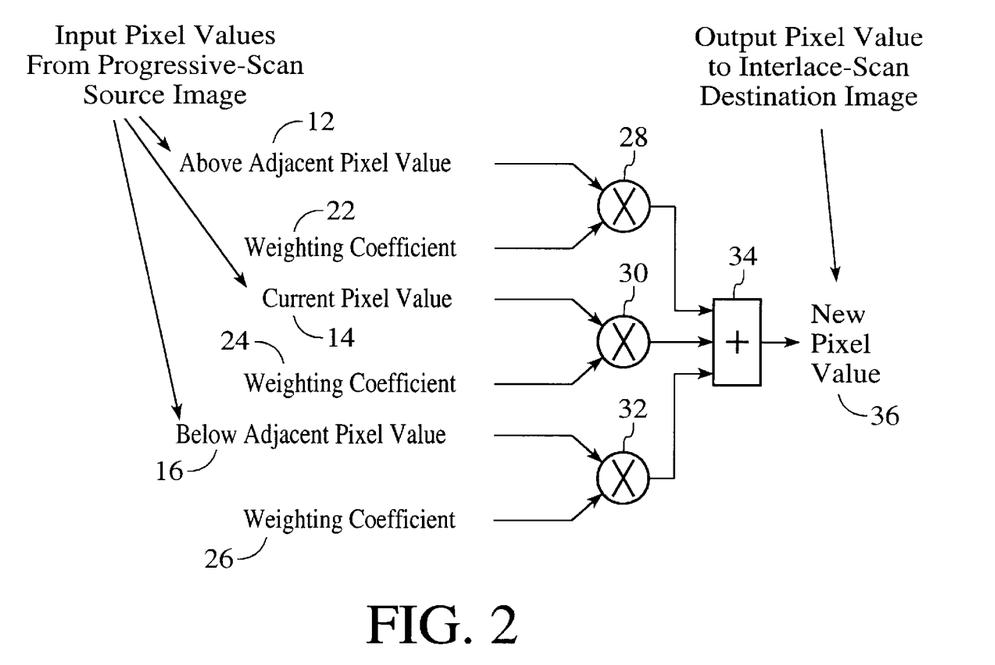
FIG. 2 is a functional illustration of a vertical spatial filter.
Figure 13:
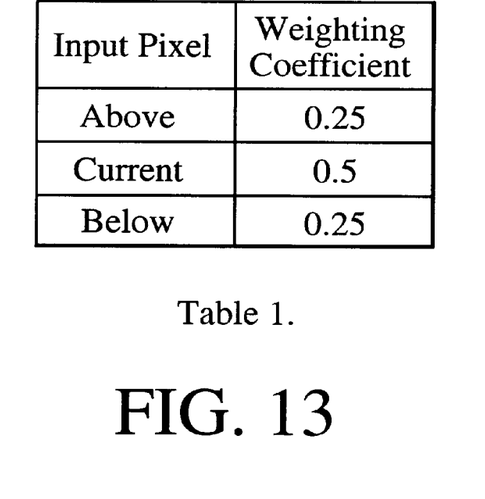
FIG. 13 shows standard weighting values for the 3-line flicker filter (Table 1).

The current standard in the PC industry for interlace flicker reduction is the three line flicker filter. The three line flicker filter takes three vertically adjacent pixels from the progressive-scanned source image, blends them using a weighted average, and outputs this value as the new pixel for the interlaced display. In effect, this creates a low-pass vertical spatial filter. This filter 10 is conceptually illustrated in FIG. 1. Conceptually, as is seen, the above pixel 12, the current pixel 14 and below pixel 16, are combined to provide resulting blended pixel 18. The filter is represented functionally in FIG. 2. Functionally, as is seen, the above adjacent pixel value 12 is combined with a first weighting coefficient 22 at combiner 28, current pixel 14 is combined with a second weighting factor 24 at combiner 30, and the below adjacent pixel value is combined with a third weighting coefficient 26 at combiner 32. The output from combiners 28, 30 and 32 are provided to adder to provide the new pixel value 18. The most common pixel weighting used in the filter is shown in Table 1. Using these weighting values, the filter is sometimes referred to as a "1-2-1 Flicker Filter". All flicker filter examples shown in this section use this 1-2-1 or 25%-50%-25% coefficient weighting.

For the purpose of illustration in this section a pixel is treated as a single value of contrast energy in relation to surrounding pixels. In actual systems, each pixel is represented by three discrete values of RGB (Red, Green, and Blue) color components. In standard applications of the 3-line flicker filter each RGB component is processed through a separate 1-2-1 weighted 3-line flicker filter.

Standard Weighting Values for the 3-Line Flicker Filter

Figure 3:
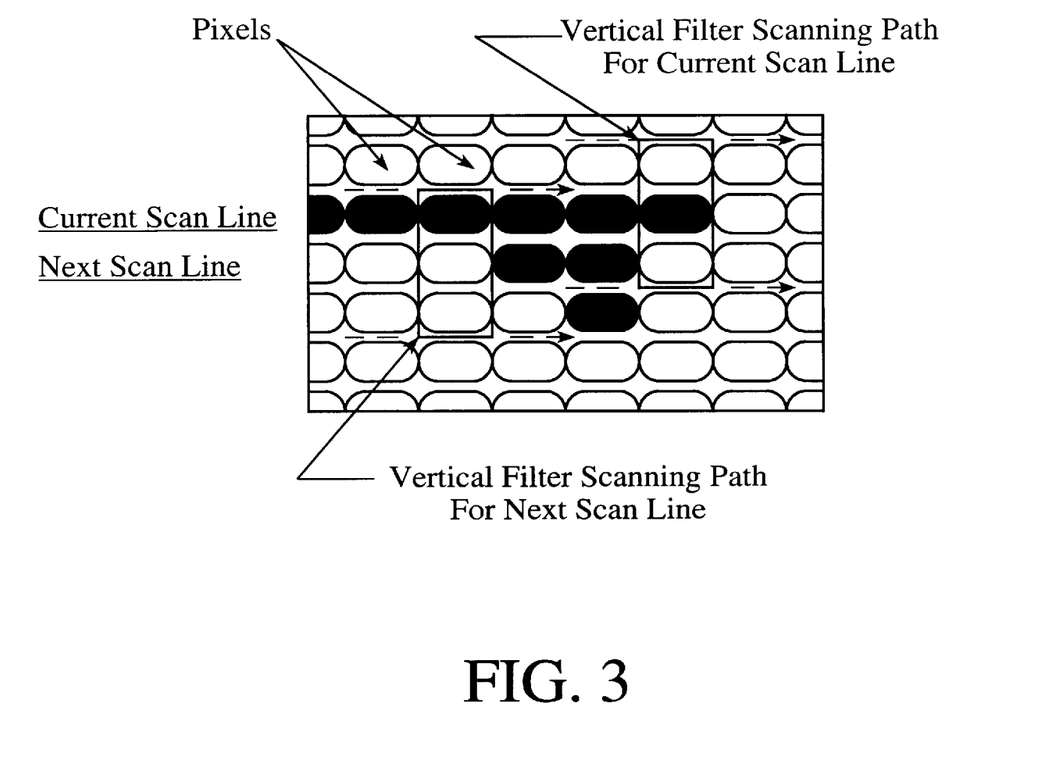
FIG. 3 illustrates the scanning of a three-pixel or triad window across the image a row at a time such that each pixel is passed through the filter's center position.

To further assist in understanding the effects of the 3-line flicker filter, the center source pixel, having the highest weighting in the output pixel, should be thought as the current scan line pixel. The three-pixel or triad window is effectively scanned across the image a row at a time such that each pixel is passed through the filter's center position. This is illustrated in FIG. 3. In total, each source pixel is passed through the vertical filter 3 times (once in the top position, once in the middle, and once in the bottom position).

As the title of FIG. 3 implies, the image is "effectively scanned" where as in the actual circuit the filter stays fixed and the streaming pixel data is passed through it. In implementation, since three scan lines of pixels are needed the two previous lines are stored which produces a one line processing latency relative to the "current" (center) scan line.

Processing of Color Components

Figure 4:
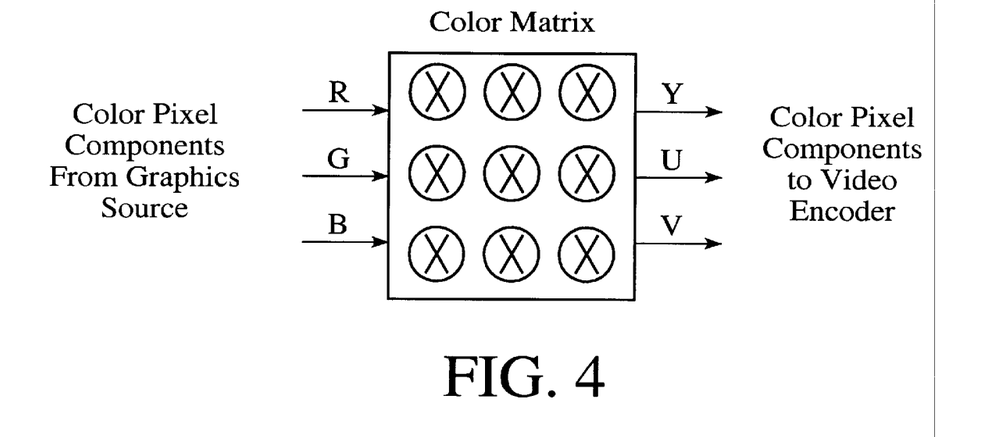
FIG. 4 shows a linear matrix multiplier.

As stated above, the image processing of the flicker filter is typically applied to the RGB components of each pixel. The flicker filter can also be applied to the image data after is converted to YUV component data which is required as part of the composite video encoding process. RGB to YUV conversion is performed with a linear matrix multiplier common called a "color matrix" 40 as shown in FIG. 4. Assuming that no other non-linear processing such as Gamma correction is performed on the video signal prior to the filter, the flicker filter can be applied to either the RGB or YUV data with no difference in outcome.

Flicker Filter Advantage: Flicker Reduction of Horizontal Lines

Figure 5:
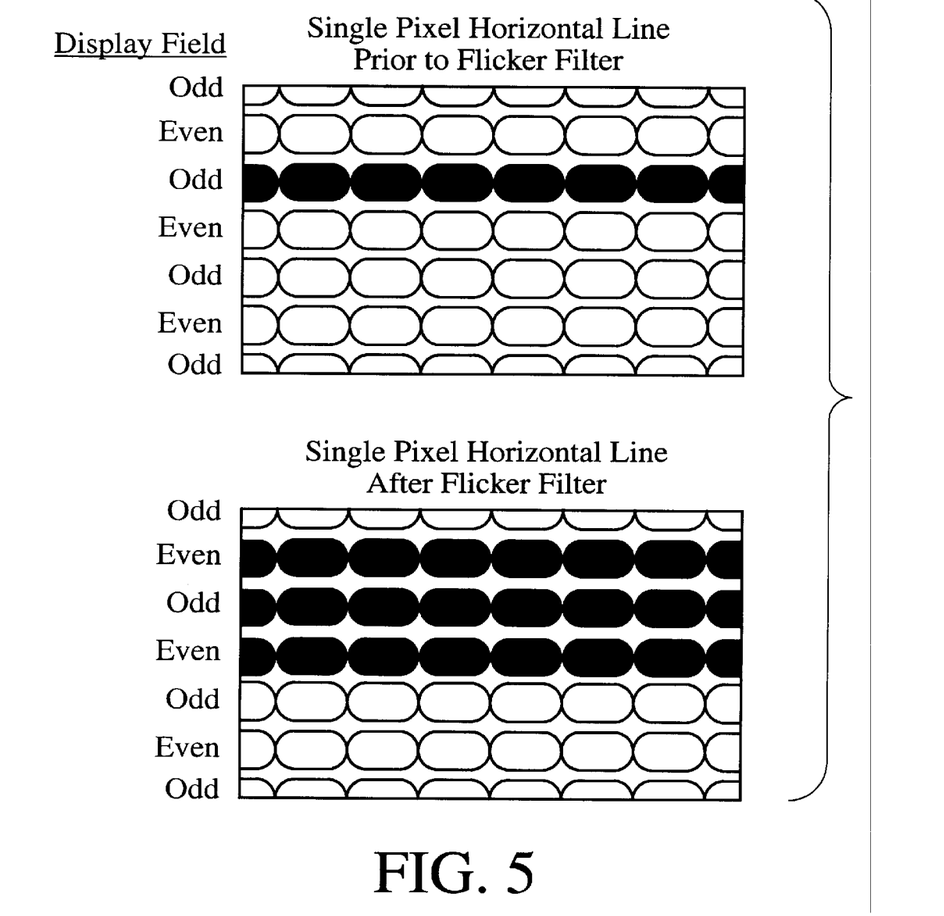
FIG. 5 is a diagram illustrating the contrast energy of the line spread onto adjacent lines utilizing a 3-line flicker filter.

Perhaps the most compelling reason to use a flicker filter is to remove the bothersome 30 Hz flicker of a single-pixel-high horizontal line in a graphics image or text. Without the flicker filter, the single horizontal line will be displayed in only the even field or odd field of the interlaced image, but not both. Using a 3-line flicker filter, as illustrated in FIG. 5, the contrast energy of the line is spread onto adjacent lines which implies into the other field when interlaced scanned at the output.

The contrast energy of the image line, originally concentrated in a single field, is now evenly distributed between the two interlaced fields. Thus, rather than contrast energy changing between odd and even field, resulting in a noticeable 30 Hz flicker, contrast energy is constant in both fields thereby refreshed at 60 times per second. This virtually eliminates visible image flicker, assuming that viewing distance is such that the image is observed as a whole, not up close for single pixel line inspection (which would be only several inches from monitor).

Image features taller than 1 pixel high are also pixel reduced. As with single pixel lines, this is due to the blending of line values at the feature's edge or contrast transition, effectively increasing refresh rate of the transition. The flicker filter spreads the contrast transition between adjacent lines in odd and even fields. There can still remain a second order effect that is referred to as flitter, however, as discussed in a later section.

Flicker Filter Disadvantage: Loss of Vertical Resolution

Figure 6:
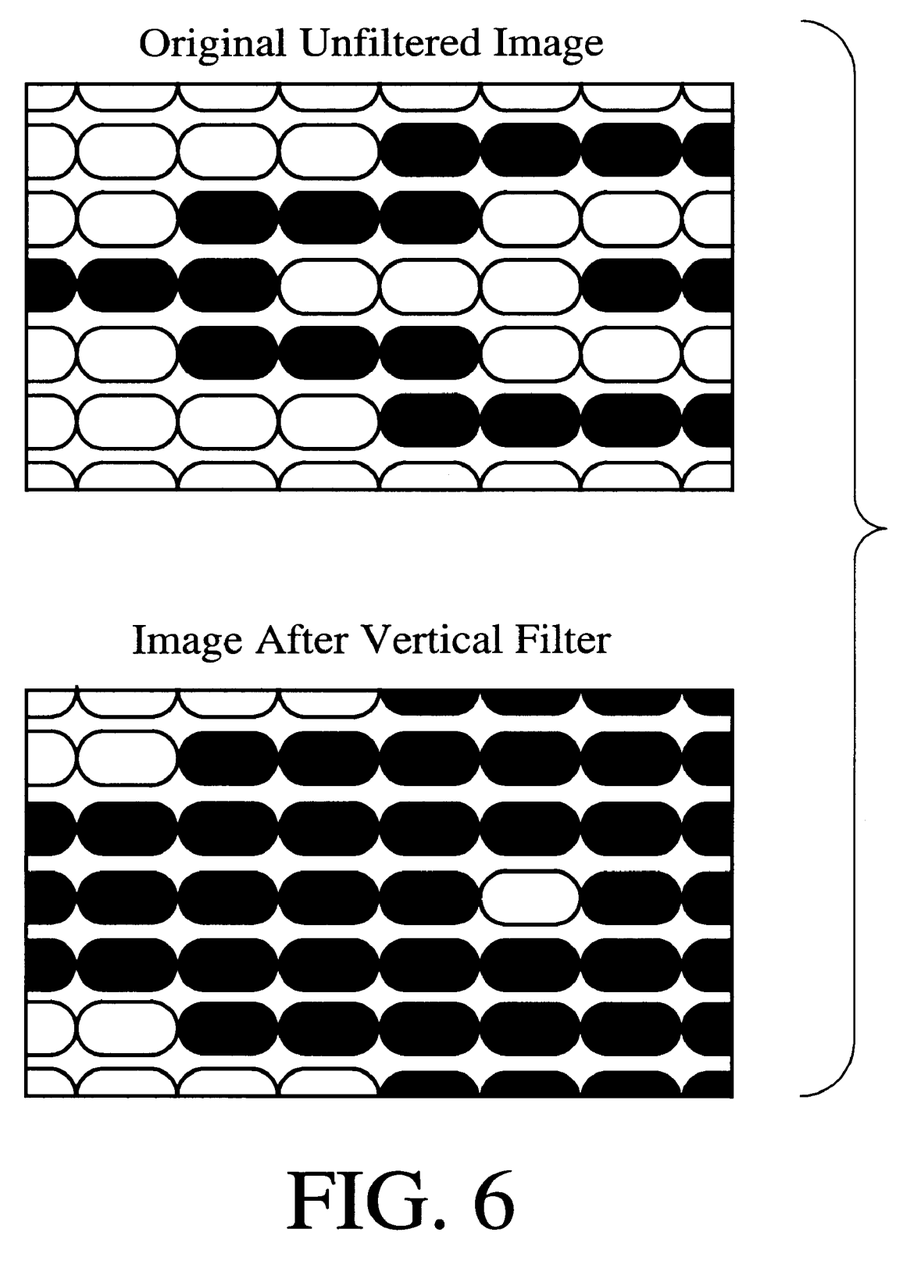
FIG. 6 shows the result of different arbitrary pixel pattern.

Because the 3-line flicker filter is essentially a vertical low-pass filter, flicker reduction is accomplished in the trade for reduced vertical resolution. Reduced vertical resolution can be noted in FIG. 5 for a single pixel horizontal line. FIG. 6 shows the result of different arbitrary pixel pattern.

Thus, the vertical filter attributes of the 3-line flicker filter limits the ability to display fine vertical detail.

Vertical Resolution Loss

Figure 7:
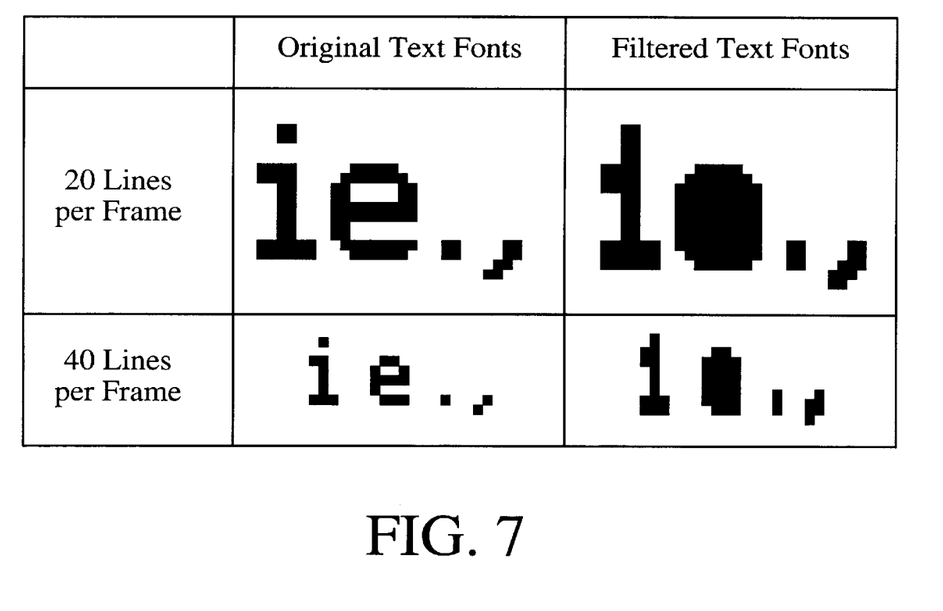
FIG. 7 shows examples of text resolution loss following 3-line flicker filter processing.

From a user application standpoint, the biggest problem of the decreased vertical resolution is in the display of text. Crisp text requires high resolution in both the horizontal and vertical axis. The 3-line flicker filter requires that the text font is made larger to remain easy to read on the interlaced scan TV display, as compared to the progressive scan computer display. FIG. 7 shows examples of text resolution loss following 3-line flicker filter processing.

Regarding FIG. 7, the following assumptions are made regarding the stated lines per frame quantity: The image display is 640×480 pixels, underscanned. At 40 lines per frame, the "e" character is 5 pixels tall, whereas a capital letter is 9 pixels tall, with 3 pixels of spacing between lines, At 20 lines per frame, all quantities are doubled; the "e" character is 10 pixels high, capital letters are 18 pixels tall, with 6 pixels spacing between lines.

From FIG. 7, it can be judged that with 3-line flicker filter 20 character lines per frame could be comfortably read while 40 lines per frame could not. Thus while the filter is effective in reducing annoying image flicker, it also limits the usefulness of the interlaced display for images rich in textual content such as web pages, email, word processing, etc.

Summary of the Standard 3-Line Flicker Filter

The 3 line flicker filter is the widely accepted standard in the computer industry due its modest complexity and overall effectiveness. In comparison, more sophisticated approaches are used in the TV broadcast industry to processes computer generated images resulting in both superior image resolution and reduction of flicker. As a result, graphics images processed through a standard 3-Line flicker filter falls short of the expected TV quality established by the broadcast industry, independent of the composite video encoder quality.

Accordingly, what is needed is a method and system for improving the image quality of an interlaced display. The present invention addresses such a need.

SUMMARY OF THE INVENTION

The present invention provides a method and system for reducing flicker within an interlaced image. The method and system comprises identifying an area of the interlaced image where flicker needs to be reduced and adaptively adjusting a pattern of pixels derived from a non-interlaced spatial relationship of the interlaced image within the area based upon characteristics of the image. A flicker filter is provided which utilizes an adaptive technique whereby pixel-blending characteristics are constantly changed within the image depending on particular image attributes. It is unique in that high vertical resolution is maintained for detailed image content such as text and most graphics, while flicker is effectively reduced on image content that is flicker prone. The filter is based on psycho-visual studies and simulations performed by the company as well as numerous prior flicker filter implementations. This has achieved the goal to maximize vertical resolution, enhancing text and graphics sharpness while still suppressing noticeable flicker. In the present invention, the flicker filter attributes are fully programmable allowing optimization for particular system configurations (screen size, display type, graphics resolutions, etc). The present invention is particularly useful for textual content which is generally not flicker prone yet requires high vertical resolution for comfortable reading.

DESCRIPTION OF THE INVENTION

The present invention relates to a method and system for improving the image quality on an interlaced video display screen. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The Inventive Adaptive Flicker Filter

The flicker reduction filter in accordance with the present invention has programmable characteristics that allow it to adapt to particular characteristics of an input image. The filter operates on vertical filter principal just like the standard 2-line or 3-line flicker filters. However, the filter is adaptive is that constant changes occur in the filter weighting coefficients, depending on image luminance characteristics measured in the immediate area being processed by the filter. As a further improvement, different filter characteristics are applied to the luminance and chrominance characteristics of the image. The net outcome from the combination of adaptive filter techniques used by the present invention is increased vertical image resolution while still effectively reducing interlace flicker.

Emphasis in Luminance Processing

According to the well-established research on the psychophysical visual perception of image flicker, flicker is primarily a luminance (brightness) phenomenon at interlace display rate. Changes in chrominance (color) value at the 30 Hz rate is not detectable by the human visual system because of lower temporal response to color. It should follow, therefore, that all progressive to interlaced scan converter systems should process luminance information only.

Chrominance Filtering

As described above, the approach to flicker reduction in accordance with the present invention is to primarily process the luminance information. A secondary flicker filter function is also applied to the "UV" chrominance components. Although theoretically it may be unnecessary to subject purely chrominance information to flicker reduction, some unexpected luminance modulation may occur with changing chrominance information due to "luminance leakage" within the TV receiver. "Luminance leakage" refers to unwanted or unexpected changes in pixel luminance value due to changes in pixel chrominance value. This can be caused by errors in the receiver's luminance/chrominance demodulation, YUV to RGB conversion, non-linearity of RGB modulation (including phosphor response), or cross talk between the YUV or RGB components.

The methodology described here is fully applicable to chrominance filtering, although less pixel weighting and different flicker reduction algorithms may be desirable. The present invention flicker filter design has programmable UV pixel weighting to allow adjustment for various display types.

The Concept of Flicker Energy

One image attribute identified and named by the application is "flicker energy". Flicker energy quantifies the cumulative effect of flicker generated by a local grouping of interlaced objects. In general, it is the integrated intensity difference between the odd and even fields for a given set of features at a given interlaced frame rate.

Figure 8:
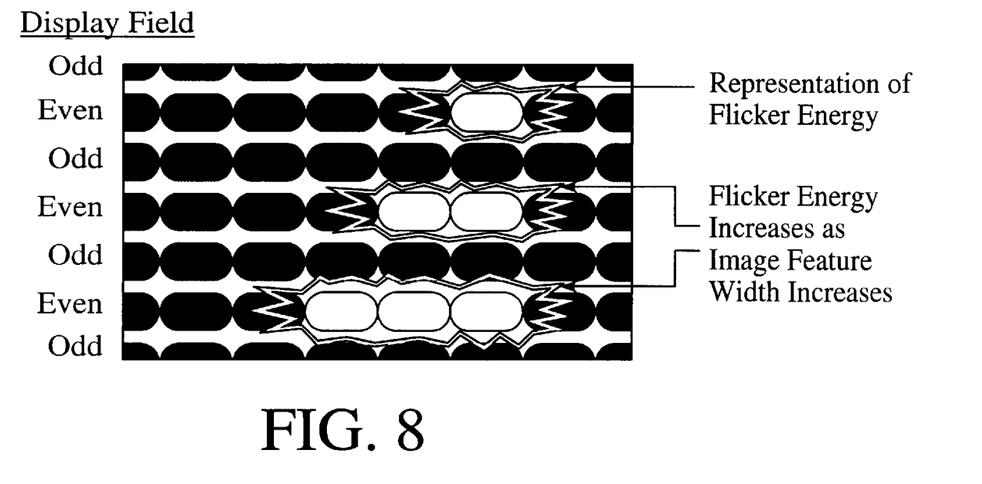
FIG. 8 illustrates the concept of flicker energy.

The concept of flicker energy can be initially understood by the simple example of shown in FIG. 8. The image feature in this example is a bright one-pixel-high horizontal line, shown on interlaced display. Three cases are shown; one, two and three pixels wide. Total flicker energy of the image feature is represented by the starburst, which increases as the feature width (in this case a line) increases.

Figure 9:
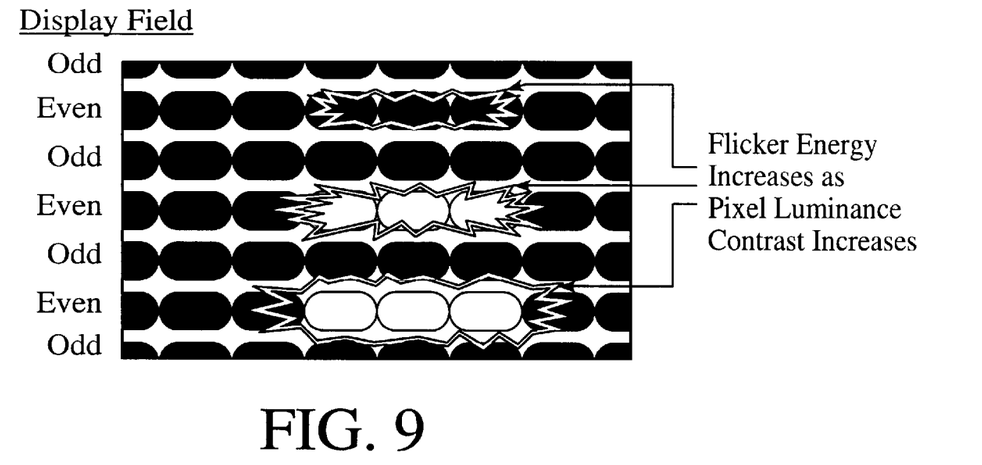
FIG. 9 shows a second example of flicker energy.

A second example of flicker energy is shown in FIG. 9. Here a line is shown at one pixel high and three pixels tall, but in three cases of varying luminance contrast. Again as represented by the starburst, total flicker energy increases as luminance contrast increases.

Figure 14:
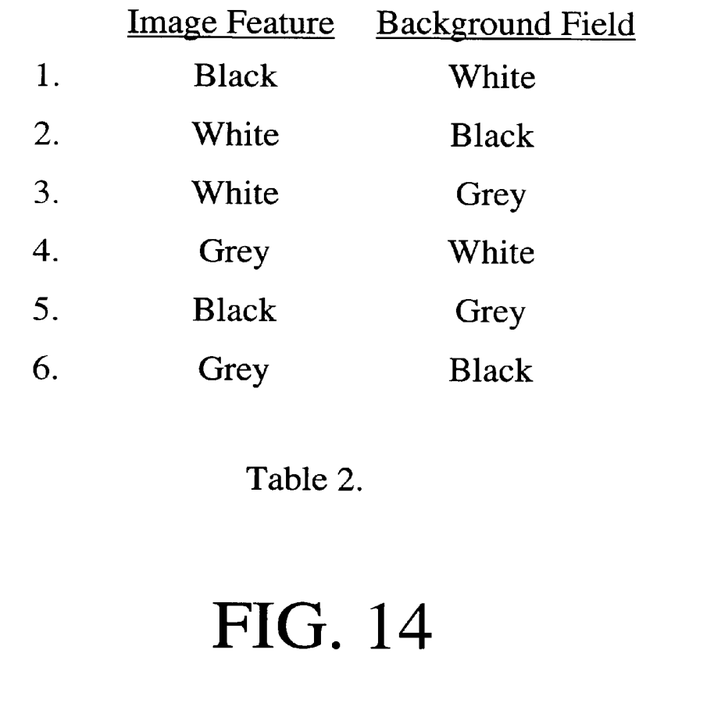
FIG. 14 shows relative degree of perceived image flicker for several image feature/background combinations (from most flicker to least flicker) (Table 2).

In addition, flicker energy can be further quantified based on contrast polarity of the feature vs. background and the average brightness of the feature/background combination. This phenomena is associated with the non-linearity of human luminance perception. To provide an example, Table 2 lists six different instances of white, black and gray feature/background combinations, assuming the image area of the feature is smaller than that of the background. Perceivable flicker is rated from highest to lowest. It can be generally observed in Table 2 that increased luminance contrast difference increases perceived flicker, which is consistent with earlier statements. However, it can also be observed that for similar contrast differences, a dark feature on a light background has more perceived flicker than does the opposite case. Therefore, it is concluded that flicker perception increases with higher average luminance value.

Flicker Energy in Image Processing

The determination of perceived flicker energy for a given feature provides a means to adjust the flicker filter coefficients to the optimum values. Features with little flicker energy, such as those that are small or those with little luminance contrast against the background, require less pixel blending thus can maintain higher spatial resolution in the processed image.

In the ideal image processing application, the filter coefficient will be based on image feature flicker energy so that the worst case flicker is controlled to an acceptable level. The most effective approach in that regard is to apply less pixel blending to smaller image features, which contribute less flicker image energy yet are important in the maintenance of image detail.

Figure 15:
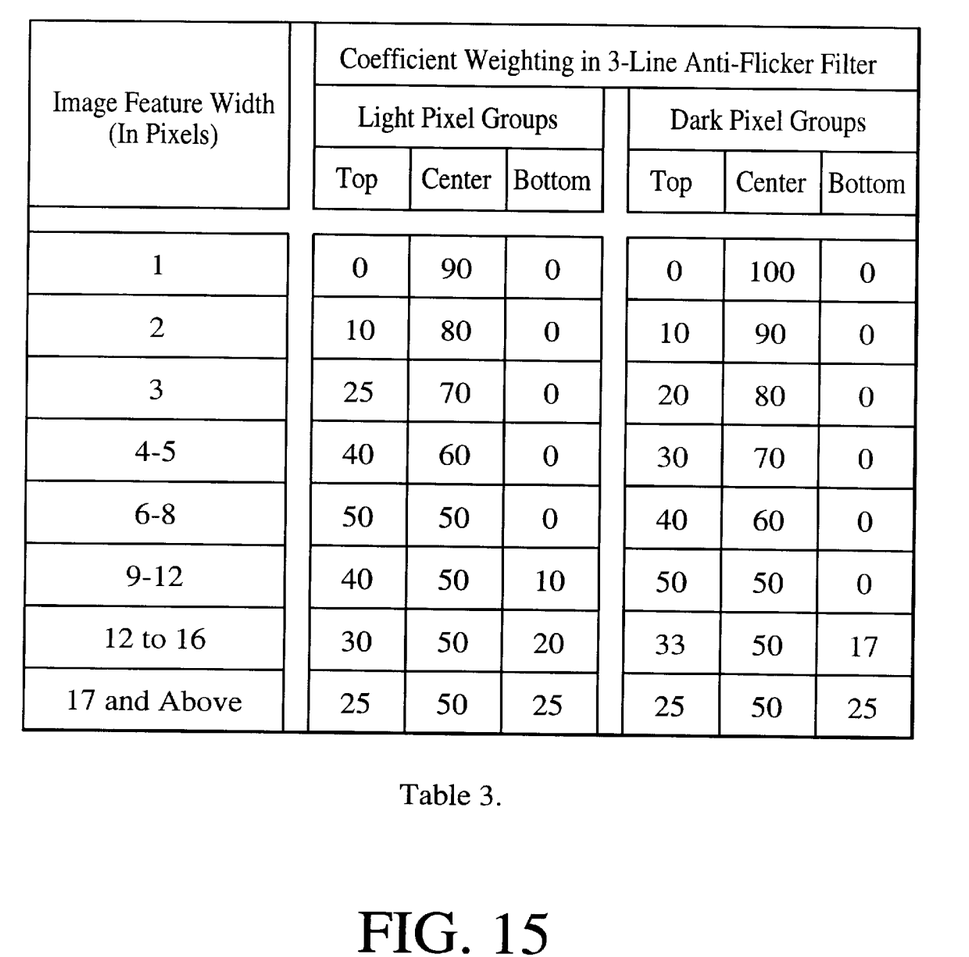
FIG. 15 shows coefficient weighting for the adaptive flicker reduction filter (Table 3).

The present invention has developed a practical means for adjusting flicker filter coefficients based on image feature width and average brightness. (Table 3 is an example of an adaptive flicker filter using the above concepts.)

The Concept of Image "Flitter".

Another concept identified and named by the company is image flitter. Image analysis performed at the present invention concludes that the visible interlace scan artifacts commonly regarded as "flicker" should be separated as "flicker" and "flitter". The Applicant considers "flicker" as the visible luminance change between odd and even fields, which occurs within our peripheral temporal response. "Flitter", on the other hand, is the visible up and down motion of an image due to differences in the odd and even frames. Flitter can occur without flicker, and visa versa.

Flicker and flitter can exist separately without the other. For example, a one-pixel-high interlaced scan line (not flicker filtered) will flicker (at frame rate) but not flicker (it won't move up and down). As explained in more detail below, a two-pixel-high interlaced scan line, not flicker filtered, technically won't flicker (because it has constant flicker energy between fields) but instead will flitter (it will jump move up and down by one line).

An image processed by the standard 3-line flicker filter will have image features that flitter. This is because the contrast boundary that has been spread across several lines by the filter has a different vertical center between the odd and even fields. Although not completely eliminated, there is considerably less flitter in an image processed by the 3-line flicker filter, however, than in an unfiltered image.

Figure 10A:
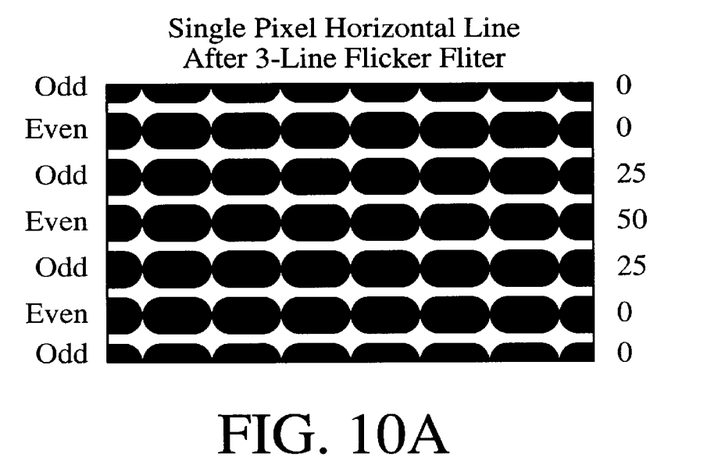
FIG. 10A is an example of an image feature that does not flitter.
Figure 10B:
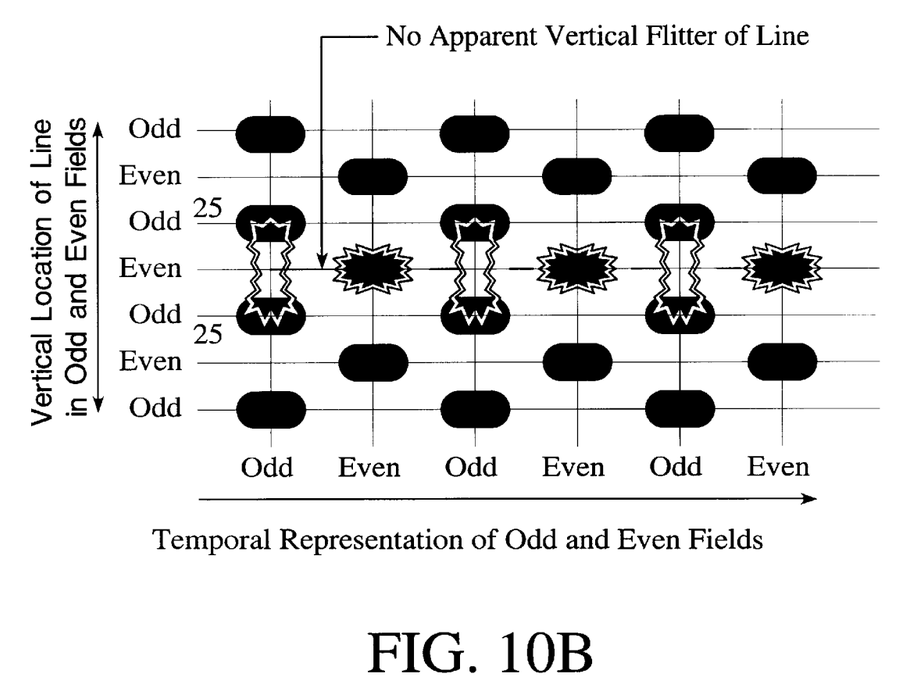
FIG. 10B illustrates the relative flicker energy changes over time between odd and even fields.

An example of an image feature that does not flitter is shown in FIG. 10A. This interlaced image feature is a one-pixel-high horizontal line that has been passed through a standard 3-line flicker filter. In FIG. 10B, a single vertical pixel column of this image is represented temporally, illustrating how the relative flicker energy changes over time been odd and even fields. As flicker is a peripheral vision effect where spatial resolution is limited, the changing aspect of the flicker energy is undetectable. This also due to psycho-visual preference of motion detection over that of flicker detection.

Figure 11A:
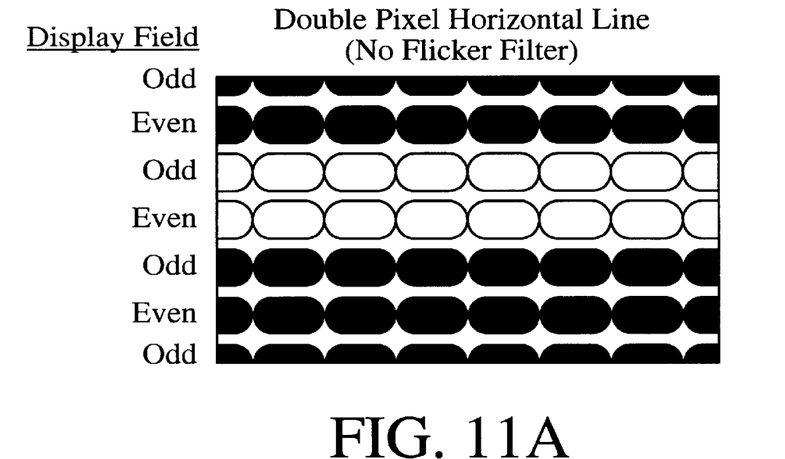
FIG. 11A is an example of image flitter.
Figure 11B:
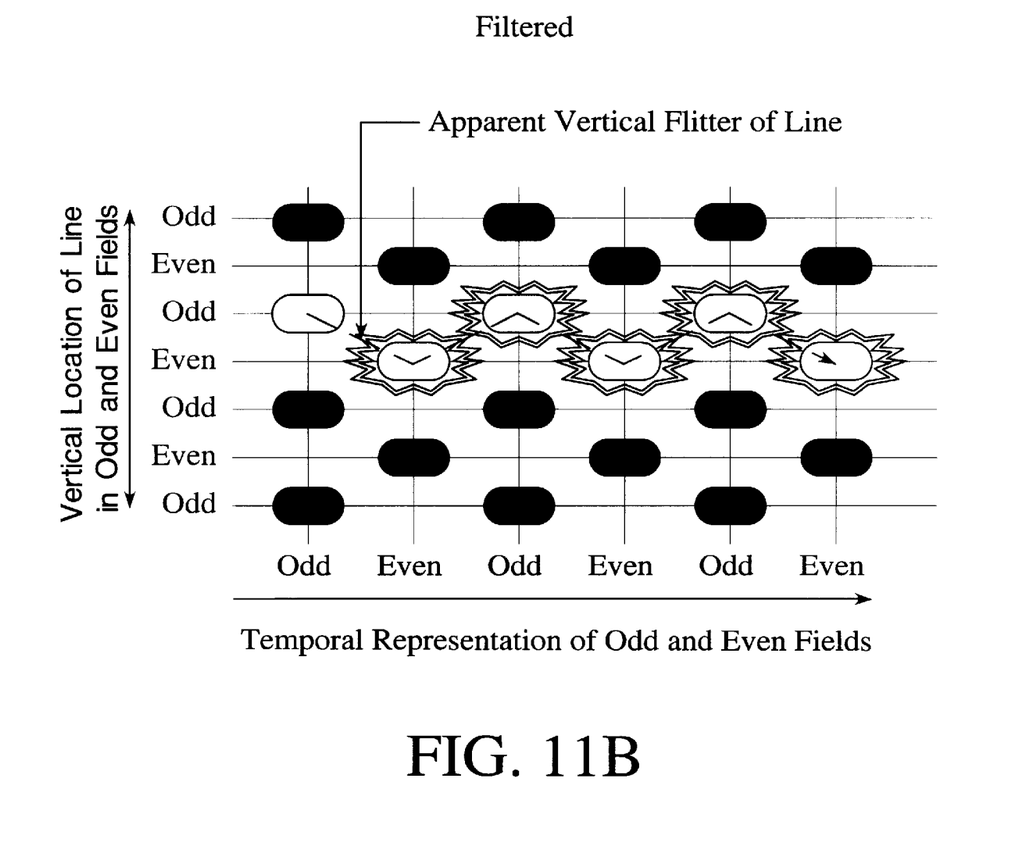
FIG. 11B shows the temporal view of a single pixel column.

An obvious example of image flitter is shown in FIG. 11A. This interlaced image feature is a two-pixel-high horizontal line that has not been flicker filtered. FIG. 11B shows the temporal view of a single pixel column. As illustrated, the center of flicker energy moves up and down by one pixel line, causing sever flitter.

Figure 12A:
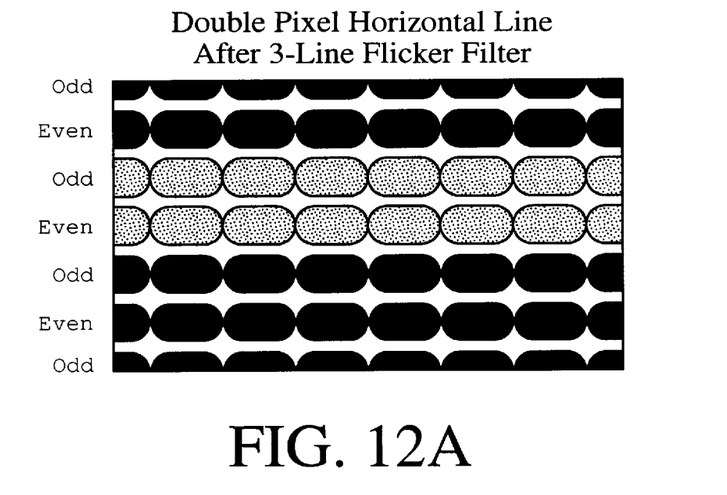
FIG. 12A is another example of image flitter.

Another example of image flitter is shown in FIG. 12A. Here, two-pixel-high horizontal line has been flicker filtered. As illustrated in the temporal response diagram of FIG. 12B, some flitter is present.

Figure 12B:
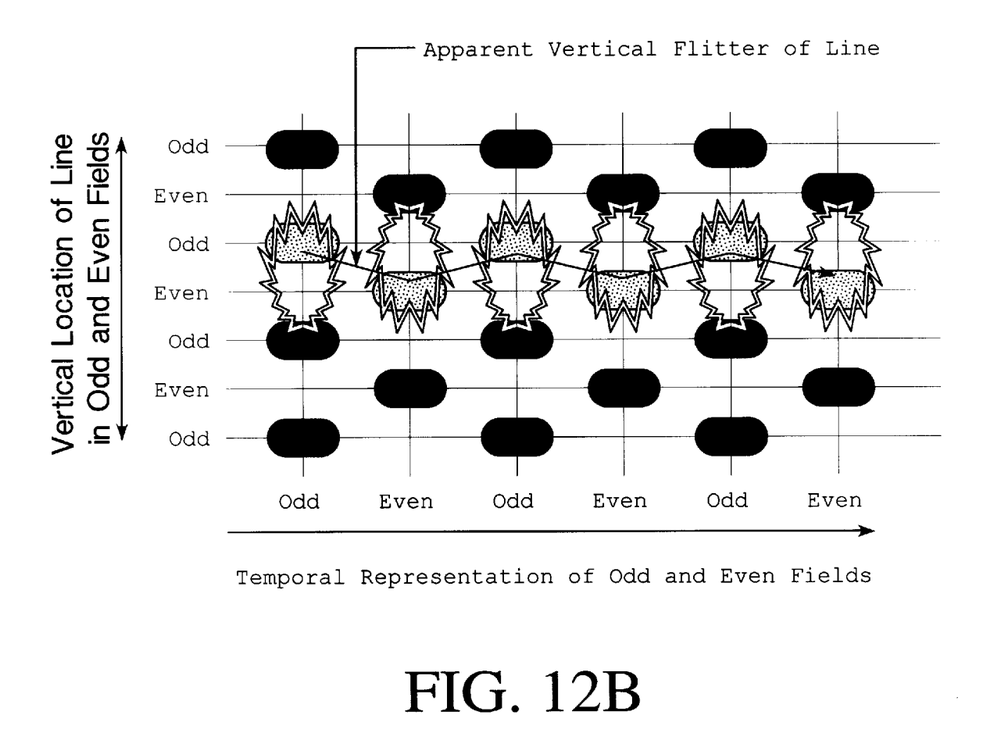
FIG. 12B is in the temporal response diagram.

In comparing FIGS. 11B and 12B, it can be seen that for some image features the standard 3-line flicker filter reduces but does not eliminate flitter.

As part of the overall "flicker reduction" process, the present invention is a proprietary method to further reduce image flitter, further improving the look and usability of interlace scanned images.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing flicker within an interlaced image comprising the steps of:
    a) identifying an area of the interlaced image where flicker needs to be reduced, the identifying step further including identifying a pattern of pixels in the horizontal direction and comparing a plurality of vertical pixel groups that are horizontally adjacent; and
    b) adaptively adjusting a pattern of pixels derived from a non-interlaced spatial relationship of the interlaced image within the area based upon characteristics of the image.

2. The method of claim 1 wherein the characteristics comprise luminance characteristics.

3. The method of claim 1 wherein the characteristics comprise chrominance and luminance characteristics, wherein the chrominance characteristics can be adjusted in a different manner than the luminance components.

4. The method of claim 1 wherein a similar pixel pattern in a horizontal axis is identified by horizontal adjacent vertical group that are similar.

5. The method of claim 1 wherein horizontal dimensions of similar pixel patterns are identified by the number of pixel patterns which are horizontally adjacent.

6. The method of claim 5 wherein a flicker reduction algorithm is based on a horizontal direction.

7. The method of claim 6 wherein a look-up table is utilized to determine the flicker reduction algorithm.

8. The method of claim 6 wherein a filter is utilized to determine the flicker reduction algorithm.

9. The method of claim 6 wherein a non-linear adaptive algorithm is utilized to determine the flicker reduction algorithm.

10. The method of claim 6 wherein the flicker reduction algorithm utilizes a plurality of vertically adjacent pixel values.

11. The method of claim 7 wherein the look-up table is user programmable.

12. The method of claim 6 wherein the flicker reduction algorithms are established such that less pixel blending occurs in shorter pixel patterns and more pixel blending occurs in longer pixel patterns.

13. The method of claim 6 in which the flicker reduction algorithm is chosen so that any number of vertical adjacent pixel values are utilized in the same image.

14. The method of claim 12 in which the flicker reduction components of the flicker reduction algorithm are modified by determining an averaged magnitude of the pixels in the vertical pixel pattern.

15. The method of claim 13 in which the flicker reduction algorithm is modified based on group intensity value derived from pixel values.

16. The method of claim 1 in which the intensity of the pixels are averaged in a weighted manner.

17. The method of claim 16 in which the pixel intensity values are combined in vertical pixel patterns.

18. The method of claim 17 in which the intensity values are based on luminance values.

19. The method of claim 17 in which the intensity values are based on luminance and chrominance values.

20. The method of claim 16 in which the average value is determined to be above or below a threshold parameter weighted to determine the group intensity values.

21. A method for reducing flicker within an interlaced image, the interlaced images comprising an even image and an odd image, comprising the steps of:
    a) determining the differences in intensity between the even and odd images, wherein the determining the differences in intensity between the even and odd images comprises calculating the density of the intensity differences utilizing the density information based upon a flicker reduction algorithm wherein the flicker reduction algorithm utilizes less blending for patterns of lower density and more blending for patterns of higher density;
    b) determining the distance between the intensity differences; and
    c) adaptively adjusting a pattern of pixels derived from the interlaced image based upon the intensity differences.

22. The method of claim 21 wherein the flicker reduction algorithm is based on a horizontal direction.

23. The method of claim 22 wherein a look-up table is utilized to determine the flicker reduction algorithm.

24. The method of claim 22 wherein a filter is utilized to determine the flicker reduction algorithm.

25. The method of claim 22 wherein a non-linear adaptive algorithm is utilized to determine the flicker reduction algorithm.

26. The method of claim 22 wherein the flicker reduction algorithm utilizes a plurality of vertically adjacent pixel values.

27. The method of claim 23 wherein the look-up table is user programmable.

28. The method of claim 22 wherein the flicker reduction algorithms are established such that less pixel blending occurs in shorter pixel patterns and more pixel blending occurs in longer pixel patterns.

29. The method of claim 22 in which the flicker reduction algorithm is chosen so that any number of vertical adjacent pixel values are utilized in the same image.

30. The method of claim 28 in which the flicker reduction components of the flicker reduction algorithm are modified by determining an averaged magnitude of the pixels in the vertical pixel pattern.

31. The method of claim 22 in which the flicker reduction algorithms are modified based on group intensity value derived from pixel values.

32. The method of claim 22 in which the intensity of the pixel are averaged in a weighted manner.

33. The method of claim 32 in which the pixel intensity values are combined in vertical pixel patterns.

34. The method of claim 33 in which the intensity values are based on luminance values.

35. The method of claim 33 in which the intensity values are based on luminance and chrominance values.

36. The method of claim 32 in which the average value is determined to be above or below a threshold parameter weighted to determine the group intensity values.

37. A method for reducing flicker within an interlaced image comprising the steps of:
   a) identifying an area of the interlaced image where flicker needs to be reduced, the identifying step further including identifying a pattern of pixels in the horizontal direction and comparing a plurality of vertical pixel groups that are horizontally adjacent; and
   b) adaptively adjusting a pattern of pixels derived from the interlaced image within the area based upon the flicker energy within the area.

38. The method of claim 37 wherein the characteristics comprise luminance characteristics.

39. The method of claim 37 wherein the characteristics comprise chrominance and luminance characteristics wherein the chrominance characteristics can be adjusted in a different manner than the luminance characteristics.

40. The method of claim 38 wherein a similar pixel pattern in a horizontal axis is identified by horizontal adjacent vertical group that are similar.

41. The method of claim 38 wherein horizontal dimensions of similar pixel patterns are identified by the number of pixel patterns which are horizontally adjacent.

42. The method of claim 41 wherein a flicker reduction algorithm is based on a horizontal direction.

43. The method of claim 42 wherein a look-up table is utilized to determine the flicker reduction algorithm.

44. The method of claim 42 wherein a filter is utilized to determine the flicker reduction algorithm.

45. The method of claim 42 wherein a non-linear adaptive algorithm is utilized to determine the flicker reduction algorithm.

46. The method of claim 42 wherein the flicker reduction algorithm utilizes a plurality of vertically adjacent pixel values.

47. The method of claim 43 wherein the look-up table is user programmable.

48. The method of claim 42 wherein the flicker reduction algorithms are established such that less pixel blending occurs in shorter pixel patterns and more pixel blending occurs in longer pixel patterns.

49. The method of claim 42 in which the flicker reduction algorithm is chosen so that any number of vertical adjacent pixel values are utilized in the same image.

50. The method of claim 48 in which the flicker reduction components of the flicker reduction algorithm are modified by determining an averaged magnitude of the pixels in the vertical pixel pattern.

51. The method of claim 37 in which a plurality of flicker reduction algorithms are modified based on group intensity value derived from pixel values.

52. The method of claim 37 in which the intensity of the pixel are averaged in a weighted manner.

53. The method of claim 52 in which the pixel intensity values are combined in vertical pixel patterns.

54. The method of claim 53 in which the intensity values are based on luminance values.

55. The method of claim 53 in which the intensity values are based on luminance and chrominance values.

56. The method of claim 52 in which the average value is determined to be above or below a threshold parameter weighted to determine the group intensity values.

57. A system for reducing flicker within an interlaced image comprising:
   means for identifying an area of the interlaced image where flicker needs to be reduced the identifying means including means for identifying a pattern of pixels in the horizontal direction and means for comparing a plurality of vertical pixel groups that are horizontally adjacent; and
   means for adaptively adjusting the pattern of pixels derived from a non-interlaced spatial relationship of the interlaced image within the area based upon characteristics of the image.

58. The system of claim 57 wherein the characteristics comprise luminance characteristics.

59. The system of claim 57 wherein the characteristics comprise chrominance and luminance characteristics, wherein the chrominance characteristics can be adjusted in a different manner than the luminance components.

60. The system of claim 57 wherein a similar pixel pattern in a horizontal axis is identified by horizontal adjacent vertical group that are similar.

61. The system of claim 58 wherein horizontal dimensions of similar pixel patterns are identified by the number of pixel patterns which are horizontally adjacent.

62. The system of claim 61 wherein a flicker reduction algorithm is based on a horizontal direction.

63. The system of claim 62 wherein a look-up table is utilized to determine the flicker reduction algorithm.

64. The system of claim 62 wherein a filter is utilized to determine the flicker reduction algorithm.

65. The system of claim 62 wherein a non-linear adaptive algorithm is utilized to determine the flicker reduction algorithm.

66. The system of claim 62 wherein the flicker reduction algorithm utilizes a plurality of vertically adjacent pixel values.

67. The system of claim 63 wherein the look-up table is user programmable.

68. The system of claim 62 wherein the flicker reduction algorithms are established such that less pixel blending occurs in shorter pixel patterns and more pixel blending occurs in longer pixel patterns.

69. The system of claim 62 in which the flicker reduction algorithm is chosen so that any number of vertical adjacent pixel values are utilized in the same image.

70. The system of claim 68 in which the flicker reduction components of the flicker reduction algorithm are modified by determining an averaged magnitude of the pixels in the vertical pixel pattern.

71. The system of claim 57 in which a plurality of flicker reduction algorithms are modified based on group intensity value derived from pixel values.

72. The system of claim 57 in which the intensity of the pixel are averaged in a weighted manner.

73. The system of claim 72 in which the pixel intensity values are combined in vertical pixel patterns.

74. The system of claim 73 in which the intensity values are based on luminance values.

75. The system of claim 73 in which the intensity values are based on luminance and chrominance values.

76. The system of claim 72 in which the average value is determined to be above or below a threshold parameter weighted to determine the group intensity values.

77. A system for reducing flicker within an interlaced image, the interlaced images comprising an even image and an odd image, comprising:

means for determining the differences in intensity between the even and odd images wherein the determining differences in intensity means comprises means for calculating the density of the intensity differences utilizing the density information based upon a flicker reduction algorithm wherein the flicker reduction algorithm utilizes less blending of patterns of lower density and more blending of patterns of higher density;

means for determining the distance between the intensity differences; and means for adaptively adjusting a pattern of pixels derived from the interlaced image based upon the intensity.

78. The system of claim 77 wherein a flicker reduction algorithm is based on a horizontal direction.

79. The system of claim 78 wherein a look-up table is utilized to determine the flicker reduction algorithm.

80. The system of claim 78 wherein a filter is utilized to determine the flicker reduction algorithm.

81. The system of claim 73 wherein a non-linear adaptive algorithm is utilized to determine the flicker reduction algorithm.

82. The system of claim 78 wherein the flicker reduction algorithm utilizes a plurality of vertically adjacent pixel values.

83. The system of claim 79 wherein the look-up table is user programmable.

84. The system of claim 78 wherein the flicker reduction algorithms are established such that less pixel blending occurs in shorter pixel patterns and more pixel blending occurs in longer pixel patterns.

85. The system of claim 78 in which the flicker reduction algorithm is chosen so that any number of vertical adjacent pixel values are utilized in the same image.

86. The system of claim 84 in which the flicker reduction components of the flicker reduction algorithm are modified by determining an averaged magnitude of the pixels in the vertical pixel pattern.

87. The system of claim 85 in which a plurality of flicker reduction algorithms are modified based on group intensity value derived from pixel values.

88. The system of claim 85 in which the intensity of the pixels are averaged in a weighted manner.

89. The system of claim 88 in which the pixel intensity values are combined in vertical pixel patterns.

90. The system of claim 89 in which the intensity values are based on luminance values.

91. The system of claim 89 in which the intensity values are based on luminance and chrominance values.

92. The system of claim 88 in which the average value is determined to be above or below a threshold parameter weighted to determine the group intensity values.

93. A system for reducing flicker within an interlaced image comprising:

means for identifying an area of the interlaced image where flicker needs to be reduced wherein the identifying means comprises means for identifying a pattern of pixels in the horizontal direction and means for comparing a plurality of vertical pixel groups that are horizontally adjacent; and means for adaptively adjusting a pattern of pixels derived from the interlaced image within the area based upon the flicker energy within the area.

94. The system of claim 93 wherein the characteristics comprise luminance characteristics.

95. The system of claim 94 wherein the characteristics comprise chrominance and luminance characteristics wherein the chrominance characteristics are adjusted in a different manner than the luminance characteristics.

96. The system of claim 94 wherein a similar pixel pattern in a horizontal axis is identified by horizontal adjacent vertical group that are similar.

97. The system of claim 94 wherein horizontal dimensions of similar pixel patterns are identified by the number of pixel patterns which are horizontally adjacent.

98. The system of claim 97 wherein a flicker reduction algorithm is based on a horizontal direction.

99. The system of claim 97 wherein a look-up table is utilized to determine the flicker reduction algorithm.

100. The system of claim 97 wherein a filter is utilized to determine the flicker reduction algorithm.

101. The system of claim 98 wherein a non-linear adaptive algorithm is utilized to determine the flicker reduction algorithm.

102. The system of claim 98 wherein the flicker reduction algorithm utilizes a plurality of vertically adjacent pixel values.

103. The system of claim 99 wherein the look-up table is user programmable.

104. The system of claim 98 wherein the flicker reduction algorithms are established such that less pixel blending occurs in shorter pixel patterns and more pixel blending occurs in longer pixel patterns.

105. The system of claim 98 in which the flicker reduction algorithm is chosen so that any number of vertical adjacent pixel values are utilized in the same image.

106. The system of claim 104 in which the flicker reduction components of the flicker reduction algorithm are modified by determining an averaged magnitude of the pixels in the vertical pixel pattern.

107. The system of claim 105 in which the flicker reduction algorithm is modified based on group intensity value derived from pixel values.

108. The system of claim 93 in which the intensity of the pixel are averaged in a weighted manner.

109. The system of claim 108 in which the pixel intensity values are combined in vertical pixel patterns.

110. The system of claim 109 in which the intensity values are based on luminance values.

111. The system of claim 109 in which the intensity values are based on luminance and chrominance values.

112. The system of claim 108 in which the average value is determined to be above or below a threshold parameter weighted to determine the group intensity values.

* * * * *